United States Patent
Casarrubias et al.

(10) Patent No.: US 11,846,912 B2
(45) Date of Patent: Dec. 19, 2023

(54) PRINTING SYSTEMS AND METHODS INCLUDING MULTILAYER FILMS

(71) Applicants: DOW GLOBAL TECHNOLOGIES LLC, Midland, MI (US); ROHM AND HAAS COMPANY, Collegeville, PA (US)

(72) Inventors: Juan Carlos Casarrubias, Toluca (MX); Nicolas Cardoso Mazzola, Sao Paulo (BR); Barry Alan Morris, Wilmington, DE (US); Jorge Caminero Gomes, Sao Paulo (BR)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 82 days.

(21) Appl. No.: 17/607,986

(22) PCT Filed: Apr. 27, 2020

(86) PCT No.: PCT/US2020/030021
§ 371 (c)(1),
(2) Date: Nov. 1, 2021

(87) PCT Pub. No.: WO2020/223137
PCT Pub. Date: Nov. 5, 2020

(65) Prior Publication Data
US 2022/0308476 A1  Sep. 29, 2022

Related U.S. Application Data

(60) Provisional application No. 62/842,012, filed on May 2, 2019.

(51) Int. Cl.
*G03G 9/135* (2006.01)
*G03G 15/16* (2006.01)
*G03G 7/00* (2006.01)

(52) U.S. Cl.
CPC ........... *G03G 7/008* (2013.01); *G03G 9/1355* (2013.01); *G03G 15/1625* (2013.01)

(58) Field of Classification Search
None
See application file for complete search history.

(56) References Cited

U.S. PATENT DOCUMENTS

| | | | |
|---|---|---|---|
| 3,264,272 A | 8/1966 | Rees | |
| 3,355,319 A | 11/1967 | Rees | |
| 3,404,134 A | 10/1968 | Rees | |
| 3,645,992 A | 2/1972 | Elston | |
| 3,914,342 A | 10/1975 | Mitchell | |
| 4,076,698 A | 2/1978 | William et al. | |
| 4,248,990 A | 2/1981 | Pieski et al. | |
| 4,321,337 A | 3/1982 | Smith | |
| 4,351,931 A | 9/1982 | Armitage | |
| 4,599,392 A | 7/1986 | McKinney et al. | |
| 5,028,674 A | 7/1991 | Hatch et al. | |
| 5,272,236 A | 12/1993 | Lai et al. | |
| 5,278,272 A | 1/1994 | Lai et al. | |
| 5,582,923 A | 12/1996 | Kale et al. | |
| 5,616,418 A | 4/1997 | Vasselin et al. | |
| 5,733,155 A | 3/1998 | Sagawa et al. | |
| 5,854,045 A | 12/1998 | Fang et al. | |
| 9,079,418 B2 | 7/2015 | Mukai et al. | |
| 10,179,470 B2 | 1/2019 | Kutsuwa et al. | |
| 10,189,281 B2 | 1/2019 | Pervan et al. | |
| 2005/0288390 A1 | 12/2005 | Lopez Munoz | |
| 2016/0282765 A1 | 9/2016 | Sharmi et al. | |

FOREIGN PATENT DOCUMENTS

| | | |
|---|---|---|
| EP | 2988935 A1 | 3/2016 |
| EP | 3006517 A1 | 4/2016 |
| GB | 968463 A | 9/1964 |
| WO | 1999/025742 A1 | 5/1999 |
| WO | 2003080356 A1 | 10/2003 |
| WO | 2018/019391 A1 | 2/2018 |

OTHER PUBLICATIONS

Overview of materials for Ethylene Vinyl Acetate Copolymer (EVA), Film Grade from MatWeb Material Property Data (https://www.matweb.com/search/datasheet.aspx?matguid=f34f846b98f1466780dfb3c0e5c0ca82), copyright 1996-2023 (Year: 2023).*
Overview of materials for Linear Low Density Polyethylene (LLDPE) from MatWeb Material Property Data (https://www.matweb.com/search/datasheet_print.aspx?matguid=bcd1ad1e1a7445aca5321d26f00bdf12); copyright 1996-2023 (Year: 2023).*
International Search Report and Written Opinion issued by the European Patent Office acting as International Searching Authority for International Patent Application No. PCT/US2020/030021 dated Jul. 31, 2020 (14 total pages).
161/162 Communication dated Dec. 10, 2021 for Application No. 20730498.1 filed Apr. 27, 2020,pp. 1-3.

* cited by examiner

*Primary Examiner* — Laura C Powers
(74) *Attorney, Agent, or Firm* — Dinsmore & Shohl LLP

(57) ABSTRACT

Embodiments of the present disclosure are directed to printing systems and methods that may include an ink composition including electrically charged ink particles dispersed in a hydrocarbon liquid and a multilayer film. The multilayer film may include a polymeric core layer; and one or more printing layers adjacent to the polymeric core layer. The one or more printing layers may include at least 50 wt. % of an ethylene vinyl acetate copolymer having acid and acrylate functional groups. The ethylene vinyl acetate copolymer having acid and acrylate functional groups may include from 0.5 wt. % to 4 wt. % methacrylic or acrylic acid; from 0.5 wt. % to 4 wt. % acrylate, from 7 wt. % to 40 wt. % vinyl acetate; and the balance ethylene, based on the total weight of the ethylene vinyl acetate copolymer having acid and acrylate functional groups.

11 Claims, No Drawings

PRINTING SYSTEMS AND METHODS INCLUDING MULTILAYER FILMS

CROSS REFERENCE TO RELATED APPLICATION

This application claims priority to U.S. Provisional Patent Application No. 62/842,012, filed on May 2, 2019, the entire disclosure of which is hereby incorporated by reference.

TECHNICAL FIELD

Embodiments described herein generally relate to multilayer films and specifically relate to multilayer films utilized in digital printing systems.

BACKGROUND

In recent years, digital press printing processes have made an impact within the graphic arts market. In conventional printing methods, which use a fixed, etched plate, ink is attracted to a substrate by the physical transfer of the ink from an ink tray to a cylinder. In digital press printing processes, ink compositions are attracted to a photo imaging plate by an electrical charge, rather than through the physical transfer from ink tray to cylinder.

SUMMARY

Digital press processes use ink compositions that include copolymers of ethylene and acrylics, which are heated and applied on top of a substrate, such as a flexible film. Like conventional printing presses, digital press printing processes use liquid ink to print an image. However, in digital printing processes, the ink includes electrically charged particles, which are attracted to an electrostatic field composed on the photo imaging plate. Once the ink composition has been placed onto the photo imaging plate, the placed ink composition is directly transferred to a heated blanket by direct contact between the heated blanket and the ink composition on the photo imaging plate. On the heated blanket, the ink particles of the ink composition may be melted into a smooth ink film, which is transferred onto the substrate.

Conventional digital press printing processes utilize over printing varnishes (OPVs) or lamination processes to protect the printed material (the transferred ink film) on final packaging structure. Additionally, conventional digital press printing processes often require a primer applied on top of a corona-treated film to provide proper wettability and anchor the printed art. The use of such primers present disadvantages that include an increase in the process complexity, increased cost associated with the process, and poor sealing when internal/external (lap seal) seals are needed for packaging design.

Therefore, there are needs for printing systems utilizing multilayer films that achieve proper wetting and anchoring of ink compositions without requiring additional primer layer or corona or plasma treatments. Embodiments of the present disclosure meet those needs by providing multilayer films that include a ink anchoring layer (a "printing layer"), which is capable of properly wetting and anchoring ink compositions during a digital printing process. The multilayer film also includes a core layer, which may allow the multilayer film to exhibit proper stiffness so that it may be printed upon using a digital printer line with proper dimensional retention.

According to at least one embodiment of the present disclosure, a printing system is provided. Embodiments of the printing system may include an ink composition including electrically charged ink particles dispersed in a liquid and a multilayer film. The multilayer film may include a polymeric core layer; and one or more printing layers adjacent to the polymeric core layer. The one or more printing layers may include at least 50 wt. % of an ethylene vinyl acetate copolymer having acid and acrylate functional groups. The ethylene vinyl acetate copolymer having acid and acrylate functional groups may include from 0.5 wt. % to 4 wt. % methacrylic or acrylic acid; from 0.5 wt. % to 4 wt. % acrylate, from 7 wt. % to 40 wt. % vinyl acetate; and the balance ethylene, based on the total weight of the ethylene vinyl acetate copolymer having acid and acrylate functional groups.

According to at least one embodiment of the present disclosure, a printing method is provided. Embodiments of the printing method may include transferring an ink composition onto a printing layer of a multilayer film. The ink composition may include electrically charged ink particles dispersed in a liquid. The multilayer film comprises a polymeric core layer and one or more printing layers adjacent to the polymeric core layer, the one or more printing layers comprising at least 50 wt. % of an ethylene vinyl acetate copolymer having acid and acrylate functional groups; and wherein the ethylene vinyl acetate copolymer having acid and acrylate functional groups comprises from 0.5 wt. % to 4 wt. % methacrylic or acrylic acid; from 0.5 wt. % to 4 wt. % acrylate, from 7 wt. % to 40 wt. % vinyl acetate; and the balance ethylene, based on the total weight of the ethylene vinyl acetate copolymer having acid and acrylate functional groups.

As such, embodiments of the present disclosure may provide printing systems and methods that may achieve proper wetting and anchoring of ink compositions during a digital printing process, without requiring additional primer layer or corona or plasma treatments.

These and other embodiments are described in more detail in the following detailed description.

DETAILED DESCRIPTION

Specific embodiments of the present application will now be described. These embodiments are provided so that this disclosure will be thorough and complete and will fully convey the scope of the subject matter to those skilled in the art.

The term "polymer" refers to a polymeric compound prepared by polymerizing monomers, whether of a same or a different type. The generic term polymer thus embraces the term "homopolymer," which usually refers to a polymer prepared from only one type of monomer as well as "copolymer," which refers to a polymer prepared from two or more different monomers. The term "interpolymer," as used herein, refers to a polymer prepared by the polymerization of at least two different types of monomers. The generic term interpolymer thus includes a copolymer or polymer prepared from more than two different types of monomers, such as terpolymers.

As used herein "acid copolymers" may be direct copolymers or graft copolymers. The term "direct copolymer" may refer to a copolymer made by polymerization of monomers together, at the same time, as distinct from a graft copolymer where a monomer is polymerized on an existing polymer chain.

"Polyethylene" or "ethylene-based polymer" shall mean polymers comprising greater than 50% by mole of units derived from ethylene monomer. This includes ethylene-based homopolymers or copolymers (meaning units derived from two or more comonomers). Common forms of ethylene-based polymers known in the art include, but are not limited to, Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE). Ethylene copolymers may be produced by processes well known in the polymer art using either autoclave or tubular reactors. The copolymerization can be run as a continuous process in an autoclave as disclosed in U.S. Pat. Nos. 3,264,272; 4,351,931; 4,248,990; and 5,028,674 and International Patent Application WO99/25742.

Ethylene vinyl acetate (EVA) is a copolymer of ethylene and vinyl acetate: Examples of EVA copolymers are available from several sources including the DuPont Company, Wilmington, Del.

The ethylene/acid copolymers and their methods of preparation are well known in the art and are disclosed in, for example, U.S. Pat. Nos. 3,264,272; 3,404,134; 3,355,319; and 4,321,337. Commercial acid copolymers suitable for use in the invention herein are available from various sources, including the DuPont Company, Wilmington, Del.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see, for example, U.S. Pat. No. 4,599,392, which is hereby incorporated by reference). LDPE resins typically have a density in the range of 0.916 to 0.940 g/cc.

The term "LLDPE," includes resin made using Ziegler-Natta catalyst systems as well as resin made using single-site catalysts, including, but not limited to, bis-metallocene catalysts (sometimes referred to as "m-LLDPE"), phosphinimine, and constrained geometry catalysts, and resins made using post-metallocene, molecular catalysts, including, but not limited to, bis(biphenylphenoxy) catalysts (also referred to as polyvalent aryloxyether catalysts). LLDPE includes linear, substantially linear, or heterogeneous ethylene-based copolymers or homopolymers. LLDPEs contain less long chain branching than LDPEs and include the substantially linear ethylene polymers, which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and blends thereof (such as those disclosed in U.S. Pat. Nos. 3,914,342 and 5,854,045). The LLDPE resins can be made via gas-phase, solution-phase, or slurry polymerization or any combination thereof, using any type of reactor or reactor configuration known in the art.

"Multilayer structure" means any structure having more than one layer. For example, the multilayer structure (for example, a film) may have two, three, four, five, or more layers. A multilayer structure may be described as having the layers designated with letters. For example, a three layer structure designated as A/B/C may have a core layer, B, and two external layers, A and C. Likewise, a structure having two core layers, B and C, and two external layers, A and D, would be designated A/B/C/D. In some embodiments, a multilayer film of the present disclosure comprises at least 2 layers. In some embodiments, a multilayer film of the present disclosure comprises up to 15 layers.

Reference will now be made in detail to embodiments of a printing system. As stated previously, embodiments of the printing system described herein may include an ink composition and a multilayer film.

Reference will now be made in detail to embodiments of the ink composition of the printing system. The ink composition may include electrically charged ink particles dispersed in a liquid. Without being bound by theory, the particles of the ink composition may be electrically charged so that the particles attract to an electrostatic field composed on a photo imaging plate during a digital printing process. The attraction of the electrically charged particles to the electrostatic field may allow the ink composition to be precisely placed onto the photo imaging plate and then transferred to a substrate, such as embodiments of the multilayers films described herein.

The electrically charged ink particles may include one or more pigments and a resin material. The resin material may include a fluoropolymer resin. The ink composition may include from about 0.001 wt. % to about 2 wt. % or from about 0.001 wt. % to about 1 wt. % of fluoropolymer resin based on the total weight of the ink composition. The one or more pigments of the electrically charged ink particles may include pigments known in the art of digital printing. The ink composition may include from about 0.001 wt. % to about 5 wt. % or from about 0.001 wt. % to about 2.5 wt. % of the one or more pigments based on the total weight of the ink composition.

As stated previously, the electrically charged ink particles may be dispersed in a liquid. The liquid may also be referred to as a "carrier liquid." In embodiments, the electrically charged ink particles may be completely encapsulated within the liquid. In some embodiments, the liquid may be a hydrocarbon liquid. In further embodiments, the hydrocarbon liquid may include a petroleum hydrocarbon. The ink composition may include less that about 90 wt. % or less than about 80 wt. % of the liquid based on the total weight of the ink composition.

Reference will now be made in detail to embodiments of the multilayer film of the printing system. The multilayer film may include a polymeric core layer; and one or more printing layers adjacent to the polymeric core layer. Without being bound by theory, it is believed that the one or more printing layers of the multilayer film may allow for proper wetting and anchoring of the ink compositions during a digital printing process, without requiring additional primer layers or corona or plasma treatments. Without being bound by theory, it is believed that the polymeric core layer of the multilayer film may provide proper stiffness so that the multilayer film may be printed on a digital printer line with proper dimensional retention.

In one or more embodiments, the multilayer film may include at least 2 layers. In some embodiments, a multilayer film of the present disclosure comprises up to 15 layers. In further embodiments, the multilayer film may include from 2 layers to 15 layers, from 2 layers to 10 layers, from 2 layers to 5 layers, from 5 layers to 15 layers, from 5 layers to 10 layers, or from 10 layers to 15 layers.

In further embodiments, the multilayer film may be a two-layer structure designated as A/B, where the printing layer may be designated A, and the polymeric core layer may be designated B. In other embodiments, the multilayer film may be a three-layer structure designated as A/B/C, where the polymeric core layer may be designated B, and the printing layers may be designated A and C.

As stated previously, embodiments of the multilayer film may include a polymeric core layer. In some embodiments, the polymeric core layer may include one or more of polyethylene terephthalate, polyamide, ethylene-based polymer, propylene-based polymer, or combinations thereof. In embodiments, the polymeric core layer includes an ethylene-based polymer. In some embodiments the polymeric core layer may include greater than 50% by mole of units derived from ethylene monomer. In further embodiments, the polymeric core layer may include ethylene-based homopolymers or copolymers. Embodiments of the polymeric core layer may include, but are not limited to, Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

In embodiments, the polymeric core layer may include an ethylene-based polymer having a 2% secant modulus greater than about 150 MPa. In some embodiments, the polymeric core layer may include an ethylene-based polymer having a 2% secant modulus of about 150 MPa to about 1500 MPa. In other embodiments, the polymeric core layer may include an ethylene-based polymer having a 2% secant modulus of from about 150 MPa to about 1000 MPa, from about 150 MPa to about 750 MPa, from about 150 MPa to about 500 MPa, from about 150 MPa to about 250 MPa, from about 250 MPa to about 1500 MPa, from about 250 MPa to about 1000 MPa, from about 250 MPa to about 750 MPa, from about 250 MPa to about 500 MPa, from about 500 MPa to about 1500 MPa, from about 500 MPa to about 1000 MPa, from about 500 to about 750 MPa, from about 750 MPa to about 1500 MPa, from about 750 MPa to about 1000 MPa, or from about 1000 MPa to about 1500 MPa. Without being bound by theory, is believed the stiffness of the polymeric core layer may allow for dimensional stability during the digital printing process.

In some embodiments, the polymeric core layer may have a density of from about 0.865 grams per cubic centimeter ($g/cm^3$) to about 0.965 $g/cm^3$, when measured according to ASTM D792. In some embodiments, the polymeric core layer may have a density of from about 0.865 $g/cm^3$ to about 0.945 $g/cm^3$, from about 0.865 $g/cm^3$ to about 0.925 $g/cm^3$, from about 0.865 $g/cm^3$ to about 0.905 $g/cm^3$, from about 0.865 $g/cm^3$ to about 0.885 $g/cm^3$, from about 0.885 $g/cm^3$ to about 0.965 $g/cm^3$, from about 0.885 $g/cm^3$ to about 0.945 $g/cm^3$, from about 0.885 $g/cm^3$ to about 0.925 $g/cm^3$, from about 0.885 $g/cm^3$ to about 0.905 $g/cm^3$, from about 0.905 $g/cm^3$ to about 0.965 $g/cm^3$, from about 0.905 $g/cm^3$ to about 0.945 $g/cm^3$, from about 0.905 $g/cm^3$ to about 0.925 $g/cm^3$, from about 0.925 $g/cm^3$ to about 0.965 $g/cm^3$, from about 0.925 $g/cm^3$ to about 0.945 $g/cm^3$, or from about 0.945 $g/cm^3$ to about 0.965 $g/cm^3$.

The polymeric core layer may have a melt flow rate of about 0.1 grams per 10 minutes (g/10 min) to about 45.0 g/10 min, when measured at 190° C. and 2.16 kg according to ASTM D1238. In some embodiments, the polymeric core layer may have a melt flow rate from about 0.2 g/10 min to about 40.0 g/10 min, from about 0.2 g/10 min to about 30.0 g/10 min, from about 0.2 g/10 min to about 20.0 g/10 min, from about 0.2 g/10 min to about 10.0 g/10 min, from about 0.2 g/10 min to about 1.0 g/10 min, from about 1.0 g/10 min to about 45.0 g/10 min, from about 1.0 g/10 min to about 30.0 g/10 min, from about 1.0 g/10 min to about 20.0 g/10 min, from about 1.0 g/10 min to about 10.0 g/10 min, from about 1.0 g/10 min to about 5.0 g/10 min, from about 10 g/10 min to about 45.0 g/10 min, from about 10.0 g/10 min to about 20.0 g/10 min, from about 10.0 g/10 min to about 15.0 g/10 min, from about 15.0 g/10 min to about 40.0 g/10 min, or from about 15.0 g/10 min to about 20.0 g/10 min.

Various commercial embodiments are considered suitable for the polymeric core layer. For example, a suitable polymeric core layer may include a linear low density ethylene-based polymer be commercially available from The Dow Chemical Company under the trademark DOWLEX™ GM 8070.

In some embodiments, the thickness of the polymeric core layer may be from about 10 microns to about 445 microns. In other embodiments, the polymeric core layer may be from about 10 micrometers (microns) to about 400 microns, from about 10 microns to about 300 microns, from about 10 microns to about 200 microns, from about 10 microns to about 100 microns, from about 100 microns to about 445 microns, from about 100 microns to about 400 microns, from about 100 microns to about 300 microns, from about 100 microns to about 200 microns, from about 200 microns to about 445 microns, from about 200 microns to about 400 microns, from about 200 microns to about 300 microns, from about 300 microns to about 445 microns, about 300 microns to about 400 microns, or from about 400 microns to about 445 microns.

Reference will now be made in detail to embodiments the one or more printing layers of the multilayer films described herein. As stated previously, without being bound by theory, it is believed that the one or more printing layers of the multilayer film may allow for proper wetting and anchoring of the ink compositions during a digital printing process, without requiring additional primer layers or corona or plasma treatments.

In embodiments, the one or more printing layers includes an ethylene vinyl acetate copolymer having acid and acrylate functional groups. The ethylene vinyl acetate copolymer having acid and acrylate functional groups may be produced directly by the copolymerization of ethylene with vinyl acetate, acrylate, and acid comonomers or by blending two or more co- or ter-polymers, by grafting, or other means known in the art. In some embodiments, the acid and acrylate functionality can be grafted onto the ethylene vinyl acetate polymer backbone. In other embodiments, the acid and acrylate functionalities may achieved by blending the ethylene vinyl acetate polymer with one or more polymers having acid groups, acrylate groups, or both. In further embodiments, the ethylene vinyl acetate copolymer having acid and acrylate functional groups may be produced by melt blending ethylene vinyl acetate polymer with ethylene copolymers or terpolymers having acid groups, acrylate groups, or both. In one embodiment, the ethylene vinyl acetate polymer may be blended with an ethylene (C3-C10) alkyl acrylate copolymer and an ethylene monocarboxylic acid copolymer, wherein the monocarboxylic acid may include acrylic acid or methacrylic acid. In another embodiment, the ethylene vinyl acetate may be blended with an ethylene alkyl acrylate monocarboxylic acid terpolymer. In one embodiment, the ethylene alkyl acrylate monocarboxylic acid terpolymer comprises ethylene isobutyl acrylate methacrylic acid terpolymer. The ethylene vinyl acetate polymer may have a melt index of from about 0.5 g/10 min to about 10 g/10 min, from about 1 g/10 min to about 10 g/10 min, from about 2 g/10 min to about 10 g/10 min, or from about 5 g/10 min to about 10 g/10 min when measured at 190° C. and 2.16 kg according to ASTM D1238. The ethylene alkyl acrylate co- or ter-polymers may have a melt index of from about 0.5 g/10 min to about 15 g/10 min, from about 1 g/10 min to about 15 g/10 min, from about 5 g/10 min to about 15 g/10 min, or from about 10 g/10 min to about 15 g/10 min when measured at 190° C. and 2.16 kg according to ASTM D1238.

Without being bound by theory, it is believed the ethylene vinyl acetate copolymer having acid and acrylate functional groups may allow for proper wetting and anchoring of the ink compositions during a digital printing process, without requiring additional primer layers or corona or plasma treatments. In embodiments, the ethylene vinyl acetate copolymer having acid and acrylate functional groups may include from about 0.5 wt. % to about 4 wt. % methacrylic or acrylic acid; from about 0.5 wt. % to about 4 wt. % acrylate, from about 10 wt. % to about 40 wt. % vinyl acetate; and the balance ethylene, based on the total weight of the ethylene vinyl acetate copolymer having acid and acrylate functional groups.

Based on the total weight of the ethylene vinyl acetate copolymer having acid and acrylate functional groups, in some embodiments, the ethylene vinyl acetate copolymer having acid and acrylate functional groups may include from about 0.5 wt. % to about 4 wt. % methacrylic or acrylic acid or from about 0.5 wt. % to about 3 wt. % from about 0.5 wt. % to about 2 wt. %, from about 0.5 wt. % to about 1 wt. % from about 1 wt. % to about 4 wt. %, from about 1 wt. % to about 3 wt. %, from about 1 wt. % to about 2 wt. %, from about 2 wt. % to about 4 wt. %, or from about 3 wt. % to about 4 wt. % methacrylic or acrylic acid.

In embodiments, the acrylate of the ethylene vinyl acetate copolymer having acid and acrylate functional groups may include alkyl acrylates having from 1 to 4 carbon atoms in the alkyl portion. In further embodiments, the acrylate may include methyl acrylate, ethyl acrylate, n-propyl acrylate, isopropyl acrylate, n-butyl acrylate, and isobutyl acrylate. In other embodiments, the acrylate of the ethylene vinyl acetate copolymer having acid and acrylate functional groups may include alkyl esters of methacrylic acid such as methyl methacrylate, ethyl methacrylate, propyl methacrylate, n-butyl methacrylate, n-hexyl methacrylate, 2-ethylhexyl methacrylate, n-octyl methacrylate, n-decyl methacrylate, and dodecyl methacrylate. Based on the total weight of the ethylene vinyl acetate copolymer having acid and acrylate functional groups, in some embodiments, the ethylene vinyl acetate copolymer having acid and acrylate functional groups may include from about 0.5 wt. % to about 4 wt. % acrylate or from about 0.5 wt. % to about 3 wt. % from about 0.5 wt. % to about 2 wt. %, from about 0.5 wt. % to about 1 wt. % from about 1 wt. % to about 4 wt. %, from about 1 wt. % to about 3 wt. %, from about 1 wt. % to about 2 wt. %, from about 2 wt. % to about 4 wt. %, or from about 3 wt. % to about 4 wt. % acrylate.

Based on the total weight of the ethylene vinyl acetate copolymer having acid and acrylate functional groups, in some embodiments, the ethylene vinyl acetate copolymer having acid and acrylate functional groups may include from about 7 wt. % to about 40 wt. % vinyl acetate or from about 7 wt. % to about 30 wt. %, from about 7 wt. % to about 20 wt. %, from about 7 wt. % to about 10 wt. %, from about 10 wt. % to about 40 wt. %; from about 10 wt. % to about 30 wt. %, from about 10 wt. % to about 20 wt. %, from about 20 wt. % to about 40 wt. %, from about 20 wt. % to about 30 wt. %, or from about 30 wt. % to about 40 wt. % vinyl acetate.

The ethylene vinyl acetate copolymer having acid and acrylate functional groups may have a density of from about 0.890 grams per cubic centimeter (g/cm$^3$) to about 0.985 g/cm$^3$, when measured according to ASTM D792. In some embodiments, the ethylene vinyl acetate copolymer having acid and acrylate functional groups may have a density of from about 0.890 g/cm$^3$ to about 0.980 g/cm$^3$, from about 0.890 g/cm$^3$ to about 0.960 g/cm$^3$, from about 0.890 g/cm$^3$ to about 0.940 g/cm$^3$, from about 0.890 g/cm$^3$ to about 0.920 g/cm$^3$, from about 0.890 g/cm$^3$ to about 0.900 g/cm$^3$, from about 0.900 g/cm$^3$ to about 0.985 g/cm$^3$, from about 0.900 g/cm$^3$ to about 0.960 g/cm$^3$, from about 0.900 g/cm$^3$ to about 0.940 g/cm$^3$, from about 0.900 g/cm$^3$ to about 0.920 g/cm$^3$, from about 0.920 g/cm$^3$ to about 0.985 g/cm$^3$, from about 0.920 g/cm$^3$ to about 0.960 g/cm$^3$, from about 0.920 g/cm$^3$ to about 0.940 g/cm$^3$, from about 0.940 g/cm$^3$ to about 0.985 g/cm$^3$, from about 0.940 g/cm$^3$ to about 0.960 g/cm$^3$, or from about 0.960 g/cm$^3$ to about 0.985 g/cm$^3$.

The ethylene vinyl acetate copolymer having acid and acrylate functional groups may have a melt flow rate of about 0.5 grams per 10 minutes (g/10 min) to about 20.0 g/10 min, when measured at 190° C. and 2.16 kg according to ASTM D1238. In some embodiments, the ethylene vinyl acetate copolymer having acid and acrylate functional groups may have a melt flow rate from about 0.5 g/10 min to about 20 g/10 min, from about 0.5 g/10 min to about 15.0 g/10 min, from about 0.5 g/10 min to about 10.0 g/10 min, from about 0.5 g/10 min to about 5.0 g/10 min, from about 0.5 g/10 min to about 1.0 g/10 min, from about 1.0 g/10 min to about 20 g/10 min, from about 1.0 g/10 min to about 15.0 g/10 min, from about 1.0 g/10 min to about 10.0 g/10 min, from about 1.0 g/10 min to about 5.0 g/10 min, from about 5.0 g/10 min to about 20.0 g/10 min, from about 5.0 g/10 min to about 15.0 g/10 min, from about 5.0 g/10 min to about 10.0 g/10 min, from about 10.0 g/10 min to about 20.0 g/10 min, from about 10.0 g/10 min to about 15.0 g/10 min, or from about 15.0 g/10 min to about 20.0 g/10 min.

In some embodiments, the one or more printing layers may include a blend of a polyolefin and the ethylene vinyl acetate copolymer having acid and acrylate functional groups. In embodiments, the one or more printing layers may include at least 50 wt. % of ethylene vinyl acetate copolymer having acid and acrylate functional groups based on the total weight of the one or more printing layers. Without being bound by theory, it is believed that the polyolefin and functionalized ethylene polymer may not be miscible and may form separate phases when blended. By including at least 50 wt. % of the ethylene vinyl acetate copolymer having acid and acrylate functional groups in the one or more printing layers, the ethylene vinyl acetate copolymer having acid and acrylate functional groups may be the continuous phase in the blend, which may allow for proper wetting or anchoring of the digital ink composition to the one or more printing layers. In some embodiments, the one or more printing layers may include from about 50 wt. % to about 100 wt. %, from about 50 wt. % to about 80 wt. %, from about 50 wt. % to about 60 wt. %, from about 60 wt. % to about 100 wt. %, from about 60 wt. % to about 80 wt. %, from about 80 wt. % to about 100 wt. % ethylene vinyl acetate copolymer having acid and acrylate functional groups.

In embodiments of the one or more printing layers including a blend of a polyolefin and the ethylene vinyl acetate copolymer having acid and acrylate functional groups, the polyolefin blended with the ethylene vinyl acetate copolymer having acid and acrylate functional groups may be made with homogeneous or heterogeneous catalyst systems and various commercial polymerization processes known in the art. In embodiments, the polyolefin blended with the ethylene vinyl acetate copolymer having acid and acrylate functional groups may have a density ranging from about 0.865 to g/cm³ about 0.940 g/cm³. In other embodiments, the polyolefin blended with the ethylene vinyl acetate copolymer having acid and acrylate functional groups may have a density of from about 0.865 g/cm³ to about 0.940 g/cm³, from about 0.865 g/cm³ to about 0.920 g/cm³, from about 0.865 g/cm³ to about 0.900 g/cm³, from about 0.865 g/cm³ to about 0.880 g/cm³, from about 0.880 g/cm³ to about 0.940 g/cm³, from about 0.880 g/cm³ to about 0.920 g/cm³, from about 0.880 g/cm³ to about 0.900 g/cm³, from about 0.900 g/cm³ to about 0.940 g/cm³, from about 0.900 g/cm³ to about 0.920 g/cm³, or from about 0.920 g/cm³ to about 0.940 g/cm³.

In further embodiments, the polyolefin blended with the ethylene vinyl acetate copolymer having acid and acrylate functional groups may include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE). In specific embodiments, the one or more printing layers may include an LLDPE. The LLDPE may have a density of from about 0.915 grams per cubic centimeter (g/cm³) to about 0.955 g/cm³, 0.915 g/cm³ to about 0.945 g/cm³, 0.915 g/cm³ to about 0.935 g/cm³, 0.915 g/cm³ to about 0.925 g/cm³. The LLDPE may have a melt index of about having a melt index of from about 0.70 g/10 min to about 1.0 g/10 min, from about 0.80 g/10 min to about 1.0 g/10 min or from about 0.90 to about 1.0 g/10 min. Various commercial embodiments of ethylene-based polymers are considered suitable to blend with the ethylene vinyl acetate copolymer having acid and acrylate functional groups for use in the one or more printing layers. For example, suitable ethylene-based polymers may be commercially available from The Dow Chemical Company under the trademark DOWLEX™ GM 8070.

Embodiments of the printing system may optionally include one or more additional layers. In embodiments, the one or more additional layers may include sealing layers, barrier layers, tie layers, or combinations thereof.

In some embodiments, the printing system may optionally include one or more sealing layers. Without being bound by theory, the one or more sealing layers may allow for the structure of the multilayer film to be heat sealable, contain the product, and protect one or more optional barrier layers. Various commercial embodiments are considered suitable for the one or more sealing layer. For example, suitable sealing layers may be commercially available as AFFINITY™ PL 1888G; ELITE™ 5401G; DOWLEX™ 2045; LDPE 611A from The Dow Chemical Company.

In some embodiments, the printing system may optionally include one or more barrier layers. In embodiments, the one or more core layers may be situated between the one or more printing layer and the one or more barrier layers. Without being bound by theory, the one or more barrier layers may aid in providing chemical resistance and prevent moisture, light, and oxygen transmission. In embodiments, the one or more barrier layers may include one or more of polyamide, ethylene vinyl alcohol, or polyvinylidene chloride (PVDC). Various commercial embodiments are considered suitable for the one or more barrier layer. For example, suitable sealing layers may be commercially available as ULTRAMID C33 from BASF, EVAL from Kuraray, SARAN from SK Chemicals, and ELITE™ 5960 G and XUS 59900.94 from The Dow Chemical Company.

In some embodiments, the printing system may optionally include one or more tie layers, which may adhere polyolefin-based films to one or more barrier layers. For example, suitable tie layers may be commercially available as such BYNEL™ 41E710 and AMPLIFY™ TY 1451B.

Reference will now be made in detail to embodiments of printing methods utilizing the printing systems described herein.

As stated previously, embodiments of the printing methods described herein may include transferring an ink composition onto a printing layer of a multilayer film. The ink composition may include electrically charged ink particles dispersed in a hydrocarbon liquid; and the multilayer film may include a polymeric core layer and one or more printing layers adjacent to the polymeric core layer, the one or more printing layers having at least 50 wt. % of an ethylene vinyl acetate copolymer having acid and acrylate functional groups.

In embodiments, the printing method may utilize a digital printing press. Various commercial embodiments of digital printing presses are considered suitable. For example, suitable digital printing presses may be commercially available from HP under the trademark Indigo™.

During the digital printing method, a laser array may be used to compose the image to be printed (i.e. the printing image) onto a light sensitive, photo imaging plate. In embodiments, the printing image may be composed onto the photo imaging plate as an electrostatic field. The electrically charged particles of the ink composition may be attracted to the electrostatic field composed on the photo imaging plate, so the electrically charged particles of the ink composition may be placed onto the photo imaging plate. In conventional printing methods, which use a fixed, etched plate, ink is attracted to the substrate by a physical transfer of the ink from an ink tray to a cylinder. In embodiments of the printing methods described herein, the ink composition is attracted to the photo imaging plate by an electrical charge, rather than the physical transfer from ink tray to cylinder.

Once the ink composition has been placed onto the photo imaging plate, the placed ink composition is then directly transferred to a heated blanket by direct contact between the heated blanket and the ink composition on the photo imaging plate. The heated blanket may also be referred to as a "thermal blanket." On the heated blanket, the ink particles of the ink composition may be melted into a smooth ink film. The heated blanket may then transfer the ink film onto the multilayer film. The heated blanket may act as a shock absorber and pressure pad to ensure even transfer of the ink film to the multilayer film. In further embodiments, the heated blanket may transfer the ink film onto the one or more printing layers of the multilayer film.

In embodiments, the heated blanket may be heated to a temperature of from about 100° C. to about 200° C. In some embodiments, the heated blanket may be heated to a temperature of from about 100° C. to about 180° C., from about 100° C. to about 160° C., from about 100° C. to about 140° C., from about 100° C. to about 120° C., from about 120° C. to about 200° C., from about 120° C. to about 180° C., from about 120° C. to about 160° C., from about 120° C. to about 140° C. to about 200° C., from about 140° C. to about 180° C., from about 140° C. to about 160° C., from about 160° C. to about 200° C., from about 160° C. to about 180° C., or from about 180° C. to about 200° C.

The printing method may include one or more additional steps. In some embodiments, the printing method may not include pre-transfer heating. In other embodiments, the printing method may include pre-transfer heating. In some embodiments, the ink composition may be supplied in a concentrated form, which may need to be diluted so that the ink composition may be printed. When the ink composition is supplied in a concentrated form, the printing method may include feeding the concentrated ink composition into ink supply tanks, diluting the concentrated ink composition, and combining the diluted ink composition with the carrier fluid, to form the ink composition comprising electrically charged ink particles dispersed in a liquid.

Test Methods

The test methods include the following:

Melt Index ($I_2$)

To test the melt index ($I_2$), ethylene-based polymer samples are measured according to ASTM D1238 at 190° C. at 2.16 kg. The values are reported in g/10 min, which corresponds to grams eluted per 10 minutes. Propylene-based polymers are measured according to ASTM D1238 at 230° C. at 2.16 kg.

Density

To test the density, samples are prepared and measured according to ASTM D4703 and reported in grams/cubic centimeter (g/cc or g/cm$^3$). Measurements are made within one hour of sample pressing using ASTM D792, Method B.

ASTM D1525 (Vicat Softening Point)

Vicat softening point is used to determine the temperature at which a specified needle penetration occurs when specimens are subjected to specified controlled test conditions according to ASTM D1525 at a heating rate of 120° C. per hour and under a load of 10 N.

ASTM 2252-03 (Ink Anchorage)

ASTM 2252-03 is a standard test used to evaluating ink or coating adhesion to flexible packaging materials using tape. ASTM 2252-03 may be used on flexible packaging materials whose surfaces may not be damaged by the application and removal of tape. To perform ASTM 2252-03, 3M #610, Sellotape office adhesive tape, or other adhesive tapes known in the field may be used. For ASTM 2252-03, the tape has a width of from about 19 mm to 25 mm (from about ¾ inches to 1 inches).

To perform ASTM 2252-03 the sample to be tested is first laid on a flat surface. The sample is laid flat and smooth without wrinkles, creases, or folds. Then, a piece of tape is cut long enough to cover the printed (or coated) area of interest on the sample. When testing large areas, several shorter pieces of tape may also be used. The tape is applied to the sample using a smooth, even motion without wrinkling the tape or sample. Then, the surface of the tape is rubbed (i.e. by a thumb or forefinger) to ensure it is fully adhered to the sample without any bubbles in surface. The sample is then held flat to a surface (i.e. with one hand), while the tape is peeled back at an angle of approximately 120 to 150° (i.e. with the other hand). For each sample to be tested, the set up time (the time in which the tap is left on the sample) for the scotch tape should be kept consistent. The tape is lifted and pulled back with an even, moderate motion, typically at rate of approximately 305 to 460 mm (12 to 18 in.) per second.

Once the tape has been pulled from the sample, the sample is examined for missing print or coating gaps. The tape is also examined for any ink or coating removed from the test sample. As an aid for visual inspection reference standards, i.e. a control, may be created and used to determine degree of transfer. Then, the results are recorded, which characterize the degree of adhesion using mutually agreed upon references. If multiple colors of ink are present, results may vary by color depending on the ink formula and may be reported that way.

ASTM F904 (Adhesion)

ASTM F904 is used to conduct bond strength and temperature resistance testing. To perform ASTM F904, ply separation is mechanically initiated by applying heat or using a solvent. The separated lines of the test specimen are then placed into the grips of an Instron tensile testing machine, Model #4442. Next, the grips are separated and the force required to further separate the plies is measured and defined as bond strength.

EXAMPLES

The following examples illustrate features of the present disclosure but are not intended to limit the scope of the disclosure. The following experiments analyzed the performance of embodiments of the print systems described herein.

Example 1—Production of Control Sample, Sample 1, and Comparative Samples A-I

Control Sample (Film with Primer)

The Control Sample used was a multilayer film that included a primer. The Control Sample was a 2-layer blown film prepared having the general formula Layer A/Layer B with 80 wt. % Layer A and 20 wt. % B based on the total weight of the multilayer film. Layer A included a blend of 80 wt. % ELITE™ 5410 (available from The Dow Chemical Company, Midland, MI) and 20 wt. % LDPE 219M (available from The Dow Chemical Company, Midland, MI) based on the total weight of Layer A. Layer B included of 100 wt. % DOWLEX™ GM 8070 (available from The Dow Chemical Company, Midland, MI) based on the total weight of Layer B. Then, 0.1-0.4 grams per square meter (gsm) of a primer (DigiPrime, available from Michelman, Inc.) was applied to Layer B prior to printing.

The Control Sample was produced using a cast extruder and the following process conditions:

TABLE 1

| Process conditions used to produce Control Film. | |
|---|---|
| Blower | 90% |
| Take Off | 8.2 meters/minute |
| Total Output | 10 kilograms/hour |
| Die Temperature | 260° C. |
| Temperature Profile | 190° C./220° C./235° C./250° C./250° C./260° C. |

Sample 1 (Multilayer Film with Printing Layer)

Sample 1 was a 2-layer film prepared having the general formula Layer A/Layer B with 80 wt. % Layer A and 20 wt. % B based on the total weight of the multilayer film.

Layer A, the core layer of the multilayer film, included a blend of 80 wt. % ELITE™ 5410 (available from The Dow Chemical Company, Midland, MI) and 20 wt. % LDPE 219M (available from The Dow Chemical Company, Midland, MI) based on the total weight of Layer A. Layer B of Sample 1 was an ethylene vinyl acetate copolymer having acid and acrylate functional groups containing approximately 18% vinyl acetate, 2% isobutyl acrylate and 2% methacrylic acid. The ethylene vinyl acetate copolymer having acid and acrylate functional groups was prepared using a single screw extruder to melt blend 80 wt. % ethylene vinyl acetate polymer with 20 wt. % ethylene isobutyl acrylate and methacrylic acid terpolymer at 200° C. The ethylene vinyl acetate polymer had 23 wt. % vinyl acetate and a melt index of 2 g/10 min as measured at 190° C. and 2.16 kg. The ethylene isobutyl acrylate methacrylic acid terpolymer had a melt index of 10 g/10 min and 10 wt. % isobutyl acrylate, and 10 wt. % methacrylic acid.

The film of Sample 1 was produced using a cast extruder and the following process conditions:

TABLE 2

Process conditions used to produce film of Sample 1.

| | |
|---|---|
| Blower | 90% |
| Take Off | 8.2 meters/minute |
| Total Output | 10 kilograms/hour |
| Die Temperature | 260° C. |
| Temperature Profile | 190° C./220° C./235° C./250° C./250° C./260° C. |

Comparative Samples A-I (Multilayer Film with Comparative Printing Layer)

Comparative Samples A-I were prepared having the general formula A/B with 80 wt. % Layer A and 20 wt. % B based on the total weight of the multilayer film. Layer A, the core layer of each multilayer film, included 80 wt. % ELITE™ 5410 (available from The Dow Chemical Company, Midland, MI) and 20 wt. % LDPE 219M (available from The Dow Chemical Company, Midland, MI) based on the total weight of Layer A. Layer B of each film included 100 wt. % functionalized with polar resins according to the compositions provided in Table 3.

The film was produced using a cast extruder and the following process conditions:

TABLE 4

Process conditions used to produce films of Comparative Samples A-I.

| | |
|---|---|
| Blower | 90% |
| Take Off | 8.2 meters/minute |
| Total Output | 10 kilograms/hour |
| Die Temperature | 260° C. |
| Temperature Profile | 190° C./220° C./235° C./250° C./250° C./260° C. |

Example 2—Performance Analysis of Control Sample, Sample 1 and Comparative Samples A-I For Example 2, ink was digitally printed onto the Control Sample and the printing layers of Sample 1 and Comparative Samples A-I. To perform the digital printing, a plate cylinder was charged using lasers with a voltage difference creating a spectrum of the desired image. Then, the ink was applied over the charged cylinder and deposited where the voltage difference was found. The ink was dried to eliminate the carrier. Then, the ink was transferred to a heated blanket set to 105° C., and the plate cylinder was discharged. By applying pressure to a tensioned, flexible substrate, the image was thermally transferred using the blanket. The ink compositions printed onto the Control Sample, Sample 1 and Comparative Samples A-I are commercially available as Electroinks from the Hewlett-Packard Company.

Once digital printing onto the Control Sample, Sample 1 and Comparative Samples A-I was complete, the ink anchor-

TABLE 3

Printing layer compositions used for digital printing trials.

| Sample | Density (g/cm³) | Melt Flow Rate (g/10 min) | Vicat Softening Point | Layer B (Printing layer) |
|---|---|---|---|---|
| Sample 1 | 0.943 | 3.2 | 65° C. (149° F.) | Ethylene vinyl acetate copolymer having acid and acrylate functional groups containing approximately 18% VA, 2% iBA and 2% MAA |
| Comp. Sample A | 0.93 | 10 | 60° C. (140° F.) | Ethylene acid terpolymer with 10% iBA and 10% MAA |
| Comp. Sample B | 0.93 | 1.6 | 52° C. (126° F.) | Anhydride modified ethylene acrylate copolymer resin containing approximately 20% MA and 0.1% MAH |
| Comp. Sample C | 0.926 | 4 | 45° C. (113° F.) | Copolymer of ethylene and butyl acrylate; EMA 27% nBA |
| Comp. Sample D | 0.92 | 11 | 79° C. (174° F.) | Terpolymer of ethylene, methacrylic acid, and acrylate containing 2% MAA and 6% iBA |
| Comp. Sample E | 0.927 | 2 | 70° C. (158° F.) | Copolymer of ethylene and methyl acrylate; EMA 9% MA |
| Comp. Sample F | 0.944 | 2 | 48° C. (118° F.) | Copolymer of ethylene and methyl acrylate; EMA 24% MA |
| Comp. Sample G | 0.95 | 2 | 56° C. (133° F.) | Anhydride-modified ethylene vinyl acetate polymer containing approximately 25% VA and 0.1% MAH |
| Comp. Sample H | 0.94 | 5.5 | 79° C. (174° F.) | Ionomer of ethylene acid copolymer; zinc ionomer with 9% MAA, 18% neutralized |
| Comp. Sample I | 0.95 | 4.8 | 65° C. (149° F.) | Ionomer of ethylene acid copolymer; zinc ionomer with 15% MAA, 23% neutralized | age of the film was tested using 3M tape according to ASTM 2252-03 described herein. The results of the ink anchorage test, ASTM 2252-03, are summarized in Table 5.

The bond strength of the Control Sample, Sample 1 and Comparative Samples A-I was also tested before and after thermal sealing. To test the bond strength of the Control Sample, Sample 1 and Comparative Samples A-I, each of the printed films were laminated with a solvent based adhesive, ADCOTE™ 577 (available from The Dow Chemical Company, Midland, MI) to a biaxially-oriented polypropylene film. After curing, the bond strength was measured before and after a thermal sealing according to ASTM F904 described herein. The bond strength results of the Control Sample, Sample 1 and Comparative Samples A-I are summarized in Table 5.

TABLE 5

Results of Ink Adhesion Test and Bond Strength of Control Sample, Sample 1 and Comparative Samples A-I.

| Sample | Tape Test | Bond Strength (gf/in) Before | Bond Strength (gf/in) After |
|---|---|---|---|
| Control Sample | PASS | 175 | 769 |
| Sample 1 | PASS | 402 | 805 |
| Comp. Sample A | PASS | 311 | 677 |
| Comp. Sample B | FAIL | | |
| Comp. Sample C | FAIL | | |
| Comp. Sample D | FAIL | | |
| Comp. Sample E | FAIL | | |
| Comp. Sample F | FAIL | 334 | 702 |

As shown by the results of Table 5, the Control Sample, Sample 1, Comparative Sample A, and Comparative Sample F passed the ink anchorage test, ASTM 2252-03, while Comparative Samples B-E and G-I failed. By passing the ink anchorage test, the Control Sample, Comparative Sample A, and Comparative Sample F showed that their printing layers were able to sufficiently retain the ink composition.

The above results of Table 5 further indicated that Sample 1 delivered higher bonds than the Control Sample, Comparative Sample A, and Comparative Sample F when the delamination is promoted.

Example 3—Effect of Corona Treatment on Sample 1 and Comp. Sample A

For Example 3, Sample 1 and Comparative Samples A were corona treated at 1-2 kW in-line immediately after the films of Sample 1 and Comparative Sample A was produced. Then, the films were treated a second time at 1 kW immediately prior to printing in order to observe the effects of corona treatment on ink adhesion. Ink was digitally printed onto the printing layers of Sample 1 and Comparative Samples A as described in Example 2.

Once digital printing onto the printing layers of Sample 1 and Comparative Sample A was complete, the ink anchorage of the films was tested as described in Example 3 according to ASTM 2252-03. The results of the ink anchorage test for corona treated and untreated Sample 1 and Comparative Sample A are summarized in Table 6.

TABLE 6

Results of Ink Adhesion Test for Sample 1 and Comparative Samples A with and without corona treatment.

| Sample | Tape Test |
|---|---|
| Sample 1, Corona Treated | PASS |
| Sample 1, Untreated | PASS |
| Comp. Sample A, Corona Treated | FAIL |
| Comp. Sample A, Untreated | PASS |

As shown by the results in Table 6, when Comparative Sample A was corona treated, the ink anchorage of the film was severely affected, resulting in failure of the tape test. However, Sample 1, both corona treated and untreated, passed the tape test. Therefore, these results show that the printing layer of Sample 1 sufficiently retained the ink composition when either corona treated or untreated and was not severely affected by corona treatment, unlike Comparative Sample A.

Example 4—Production of Printing Layers Comprising Blends

Samples 2-5 and Comparative Samples J-N (Multilayer Films with Printing Layer)

In Example 4, printing layers were tested by producing 7-layer films that included blends of ethylene-based polymers and polar resins. Each film had a thickness of approximately 100 microns and a width of approximately 12 inches (approximately 30.48 centimeters).

The layers extruded through Extruders A-B were the same for each film of Samples 2-5 and Comparative Samples J-N. Extruders C, D, and E included an HDPE (commercially available as XUS 59900.94 from The Dow Chemical Company) and an LDPE (commercially available as AGILITY™ 1021 from The Dow Chemical Company). Extruders F and G included DOWLEX™ 8070G (available from The Dow Chemical Company). The layers of the films for Samples 2-5 and Comparative Samples J-N are subsequently provided in Table 8.

TABLE 7

Layers of the Samples 2-8 and Comparative Examples J and K.

| | | Amount | Thickness |
|---|---|---|---|
| Extruder A | Printing Layer; see Table 8 | 10 wt. % | 15 microns |
| Extruder B | Printing Layer; see Table 8 | 10 wt. % | 15 microns |
| Extruder C | XUS 59900.94 AGILITY 1021 | 20 wt. % | 30 microns |
| Extruder D | XUS 59900.94 AGILITY ™ 1021 | 20 wt. % | 30 microns |
| Extruder E | XUS 59900.94 AGILITY ™ 1021 | 20 wt. % | 30 microns |
| Extruder F | DOWLEX ™ 8070G | 10 wt. % | 15 microns |
| Extruder G | DOWLEX ™ 8070G | 10 wt. % | 15 microns |
| Film Total | 7-layer film | 100 wt. % | 150 microns |

Samples 2-5 and Comparative Samples J-N differed by their printing layers, extruded through Extruders A and B. Samples 2-5 included an ethylene vinyl acetate copolymer having acid and acrylate functional groups blended with varying amounts of ethylene-based polymers including an LLDPE (commercially available as DOWLEX™ 8070 G from The Dow Chemical Company), a low melt index copolymer (commercially available as VERSIFY™ 2000 from The Dow Chemical Company), or an HDPE (commercially available as VERSIFY™ 2000 from The Dow Chemical Company). The ethylene vinyl acetate copolymer having acid and acrylate functional groups included approximately 18% vinyl acetate, 2% isobutyl acrylate and 2% methacrylic acid based on the total weight of the ethylene vinyl acetate copolymer having acid and acrylate functional groups. The printing layer of Comparative Sample M included ethylene vinyl acetate copolymer (commercially available as ELVAX™ 3128 from The Dow Chemical Company). The printing layer of Comparative Sample N included an LLDPE (commercially available as DOWLEX™ 8070 G from The Dow Chemical Company). The composition of the printing layers for each of Samples 2-5 and Comparative Samples J-N are provided subsequently in Table 8.

TABLE 8

Compositions of the Printing Layer of Samples 2-5 and Comparative Examples J-N.

| Sample | Printing layers |
|---|---|
| Sample 2 | 100 wt. % (based on the total weight of the B-layer) ethylene vinyl acetate copolymer having acid and acrylate functional groups with 18 wt. % (based on the total weight of the ethylene vinyl acetate copolymer having acid and acrylate functional groups) VA, 2 wt. % iBA and 2 wt. % MAA |
| Comp. Sample J | 30 wt. % (based on the total weight of the B-layer) ethylene vinyl acetate copolymer having acid and acrylate functional groups containing approximately 18% VA, 2% iBA and 2% MAA; 70 wt. % LLDPE (DOWLEX ™ 8070G) |
| Sample 3 | 70 wt. % ethylene vinyl acetate copolymer having acid and acrylate functional groups containing approximately 18% VA, 2% iBA and 2% MAA; 30 wt. % LLDPE (DOWLEX ™ 8070G) |
| Comp. Sample K | 30 wt. % ethylene vinyl acetate copolymer having acid and acrylate functional groups containing approximately 18% VA, 2% iBA and 2% MAA; 70 wt. % VERSIFY ™ 2000 |
| Sample 4 | 70 wt. % ethylene vinyl acetate copolymer having acid and acrylate functional groups containing approximately 18% VA, 2% iBA and 2% MAA; 30 wt. % VERSIFY ™ 2000 |
| Comp. Sample L | 30 wt. % ethylene vinyl acetate copolymer having acid and acrylate functional groups containing approximately 18% VA, 2% iBA and 2% MAA 70 wt. % XUS 59900.94 |
| Sample 5 | 70 wt. % ethylene vinyl acetate copolymer having acid and acrylate functional groups containing approximately 18% VA, 2% iBA and 2% MAA 30 wt. % XUS 59900.94 |
| Comp. Sample M | 100 wt. % Ethylene vinyl acetate copolymer (ELVAX ™ 3128) |
| Comp. Sample N | 100 wt. % LLDPE (DOWLEX ™ 8070G) |

Example 5—Performance Analysis of Printing Layers Comprising Blends

For Example 5, an image was digitally printed onto the Control Sample and the printing layers of Samples 2-5 and Comparative Samples J-N. To perform the digital printing, a plate cylinder was charged using lasers with a voltage difference creating a spectrum of the desired image. Then, the ink was applied over the charged cylinder and deposited where the voltage difference was found. The ink was dried to eliminate the carrier. Then, the ink was transferred to a heated blanket set to 105° C., and the plate cylinder was discharged. By applying pressure to a tensioned, flexible substrate, the image was thermally transferred using the blanket. The process was repeated in a semi rotary loop to digitally print on the Control Sample and the printing layers of Samples 2-5 and Comparative Samples J-N.

Once the ink compositions were digitally printed onto the Control Sample and the printing layers of Samples 2-5 and Comparative Samples J-N, the ink anchorage test was performed according to ASTM 2252-03 using 3M tape. Trials of the ink anchorage test included testing each fresh Sample immediately after digital printing, each Sample 10 minutes after digital printing, and each Sample 60 minutes after digital printing. The results of the ink anchorage test are summarized in Table 9.

The bond strength of the Control Sample and the printing layers of Samples 1-7 and Comparative Samples J-K was also tested according to ASTM F904 described herein. The bond strength results of the Control Sample and the printing layers of Samples 1-7 and Comparative Samples J-K are also summarized in Table 9.

TABLE 9

Results of Ink Adhesion Test and Bond Strength of Samples 1-10.

| | Ink Adhesion Test | | | Seal |
|---|---|---|---|---|
| Sample | Fresh | 10 min | 60 min | Strength |
| Control Sample | PASS | PASS | PASS | 0 |
| Sample 2 | PASS | PASS | PASS | 3425 |
| Sample J | FAIL | FAIL | FAIL | 4005 |
| Sample 3 | PASS | PASS | PASS | 4059 |
| Sample K | FAIL | FAIL | FAIL | 3201 |
| Sample 4 | FAIL | FAIL | FAIL | 1414 |
| Sample L | FAIL | FAIL | FAIL | 3871 |
| Sample 5 | FAIL | FAIL | FAIL | 3664 |
| Comp. Sample M | FAIL | FAIL | FAIL | 4168 |
| Comp. Sample N | FAIL | FAIL | FAIL | 4314 |

As shown by the results of Table 9, Samples 2 and 3 passed the ink anchorage test, ASTM 2252-03, while Samples 4 and 5, and Comparative Samples J-N failed. As provided in Table 8, Samples 2 and 3 both included printing layers that comprises greater than 50 wt. % ethylene vinyl acetate copolymer having acid and acrylate functional groups with approximately 18% VA, 2% iBA and 2% MAA. From these results, it was apparent that for the Control Sample, the use of primers may present some disadvantages including an increase in process complexity, extra cost associated with the process, and poor sealing when internal/external (lap seal) seals are needed for packaging design.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A printed article comprising:
   an ink composition comprising electrically charged ink particles dispersed in a liquid; and
   a multilayer film comprising a polymeric core layer and one or more printing layers adjacent to the polymeric core layer, wherein
      the one or more printing layers comprise at least 50 wt. % of an ethylene vinyl acetate copolymer having acid and acrylate functional groups,
      the ethylene vinyl acetate copolymer comprises from 0.5 wt. % to 4 wt. % methacrylic or acrylic acid; from 0.5 wt. % to 4 wt. % acrylate; from 16 wt. % to 20 wt. % vinyl acetate; and the balance ethylene, based on the total weight of the ethylene vinyl acetate copolymer,
      the balance ethylene comprises a linear low density ethylene-based polymer, the ink composition is deposited onto the printing layer, and
      the printed article passes an ink anchorage test according to ASTM 2252-03.

2. The printed article of claim 1, wherein the ethylene vinyl acetate copolymer having acid and acrylate functional groups has a density of from 0.890 g/cm$^3$ to 0.980 g/cm$^3$, when measured according to ASTM D792.

3. The printed article of claim 1, wherein the ethylene vinyl acetate copolymer having acid and acrylate functional groups has a melt flow rate of about 0.5 grams per 10 minutes (g/10 min) to about 20.0 g/10 min, when measured according to ASTM D1238.

4. The printed article of claim 1, wherein the ethylene vinyl acetate copolymer having acid and acrylate functional groups has a melt flow rate of about 1.0 grams per 10 minutes (g/10 min) to about 10.0 g/10 min, when measured at 190° C. and 2.16 kg according to ASTM D1238.

5. The printed article of claim 1, wherein the polymeric core layer comprises an ethylene-based polymer with a 2% secant modulus above 150 MPa, when measured according to ASTM D882.

6. The printed article of claim 1, further comprising one or more of:
   a sealing layer containing the multilayer film,
   a barrier layer situated between the polymeric core layer and the one or more printing layers,
   a tie layer situated between the barrier layer and the one or more printing layers, wherein the one or more printing layers further comprise at most 50 wt. % polyolefins, or
   combinations thereof.

7. A printing method comprising transferring an ink composition onto a printing layer of a multilayer film to produce a printed product, wherein:
   the ink composition comprises electrically charged ink particles dispersed in a liquid;
   the multilayer film comprises a polymeric core layer and one or more printing layers adjacent to the polymeric core layer,
   the one or more printing layers comprises at least 50 wt. % of an ethylene vinyl acetate copolymer having acid and acrylate functional groups,
   the ethylene vinyl acetate copolymer comprises from 0.5 wt. % to 4 wt. % methacrylic or acrylic acid; from 0.5 wt. % to 4 wt. % acrylate; from 16 wt. % to 20 wt. % vinyl acetate; and the balance ethylene, based on the total weight of the ethylene vinyl acetate copolymer,
   the balance ethylene comprises a linear low density ethylene-based polymer, and
   the printed product passes the ink anchorage test according to ASTM 2252-03.

8. The printing method of claim 7, wherein the ethylene vinyl acetate copolymer having acid and acrylate functional groups has a density of from 0.890 g/cm$^3$ to 0.980 g/cm$^3$, when measured according to ASTM D792.

9. The printing method of claim 7, wherein the ethylene vinyl acetate copolymer having acid and acrylate functional groups has a melt flow rate of about 0.5 grams per 10 minutes (g/10 min) to about 20.0 g/10 min, when measured at 190° C. and 2.16 kg according to ASTM D1238.

10. The printing method of claim 7, wherein the ink composition is directly transferred onto the printing layer of the multilayer film without a primer.

11. The printing method of claim 7, wherein the polymeric core layer comprises an ethylene-based polymer with a 2% secant modulus above 250 MPa, when measured according to ASTM D882.

* * * * *